March 19, 1968   P. GUIENNE   3,373,837
FEED SYSTEMS FOR MULTIPLE AIR CUSHION TYPE PLATFORMS
Filed Jan. 28, 1966

Inventor
Paul Guienne
By Stevens Davis Miller & Mosher
Attorneys

United States Patent Office 3,373,837
Patented Mar. 19, 1968

3,373,837
FEED SYSTEMS FOR MULTIPLE AIR
CUSHION TYPE PLATFORMS
Paul Guienne, Paris, France, assignor to Bertin & Cie,
Paris, France, a company of France
Continuation-in-part of application Ser. No. 317,672,
Oct. 21, 1963. This application Jan. 28, 1966, Ser.
No. 523,748
Claims priority, application France, Feb. 1, 1965,
3,983
10 Claims. (Cl. 180—118)

This application is a continuation-in-part of United States application Ser. No. 317,672, filed on Oct. 21, 1963, and issued on Feb. 8, 1966, as Patent No. 3,233,692.

There was described in the French Patent No. 1,349,-243 means whereby a common compressor feeds a plurality of air cushions independently, or at least substantially so for all practical purposes. These means comprise a conduit for distributing the compressed fluid to a plurality of cushions, upflow of each of which is a normally-open valve which closes, at least partially, as soon as an accidental increase in the leakage rate from a given cushion modifies the aerodynamic and elastic restoring forces exerted upon hte valve associated to that cushion.

Conveniently, each valve may be pivotally mounted and urged by a spring towards a stop which avoids a null flow through the valve at the limit position of closure thereof. In the form of embodiment above described, the position of any given valve is determined by the pressures applied to it directly, these pressures being those which prevail in the cushion associated to said valve and in the conduit distributing the gas from the compressor to that and the other cushions.

In contradistinction, the basic means used in accordance with the invention for operating each valve is a mechanism responsive to said pressures but distinct from the valve itself.

Preferably, this mechanism is a capsule or bellows positioned in the distribution conduit and hence subjected externally to the static pressure prevaiilng therein, and the interior of this bellows communicates with the cushion associated to the valve in question.

The pressure takeoff for the bellows in the cushion may be an ordinary static pressure takeoff. Alternatively, recourse may be had to a static or dynamic pressure takeoff which is positioned adjacent the valve closure point whereby to be directly responsive to variations in the rate of flow of fluid through the valve. Lastly, the pressure takeoff may be adjustably by-passed in operation by the pilot of the platform by means of a conduit equipped with a valve and interconnecting the interior of the bellows with a second pressure takeoff positioned within the distribution conduit.

These extremely simple constructional features take advantage of the energy of the fluid set under pressure by the compressor. The constitute servomechanisms, of which alternative, for example hydraulic, designs can readily be devised. They possess superior sensitivity to the means described in the above mentioned patent specification and can easily be continuously regulated in operation.

The description which follows with reference to the accompanying non-limitative exemplary drawings will give a clear understanding of the invention, such features thereof as emerge either from the description or the drawings obviously falling within the scope of the invention.

Figure 1:
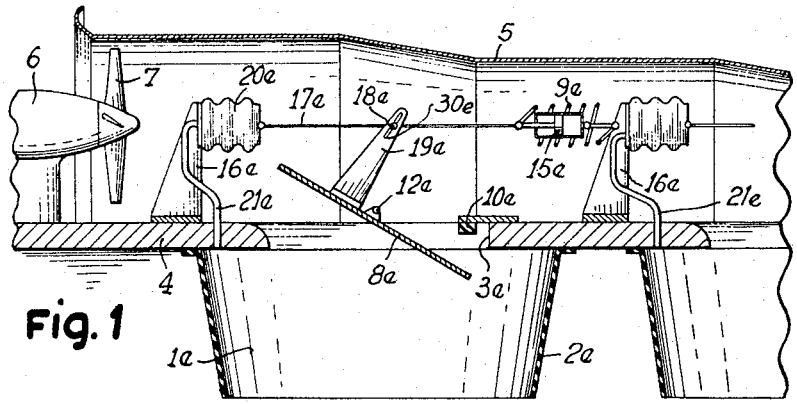
FIGURE 1 shows in fragmental sectional elevation a platform supported on a plurality of air cushions which are supplied virtually independently by means of pneumatically operated valves.

In all the figures in the accompanying drawings the platform is generally designated by reference numeral 4 and supports means for bounding a plurality of air cushions $1e$, $1f$, $1g$ and example of such means being flexible frusto-conical skirts $2e$, $2f$, $2g$. The cushions are supplied by a compressor 7 which is driven by a motor 6 and delivers its outflow into a distribution conduit 5 communicating with the various cushions through passages $3e$, $3f$, $3g$. These passages are respectively equipped with valves $8e$, $8f$ $8g$ (such as butterfly valves) mounted on shafts $12e$, $12f$, $12g$ and total closure of which is prevented by stops $10e$, $10f$, $10g$ respectively. Springs $9e$, $9f$, $9g$, possibly associated to a damper $15e$ and continuously urging the corresponding valves $8e$, $8f$, $8g$ into the fully open position thereof, have their actions counterbalanced by the respective actions of hollow deformable elements $20e$, $20f$, $20g$ such as bellows or capsules, the exterior of each of which is subjected to the pressure prevailing in distribution conduit 5 and the interior to a pressure equal to or lying between the pressures respectively prevailing in said distribution conduit and in the corresponding cushions $1e$, $1f$ or $1g$ associated to the particular valve $8e$, $8f$ or $8g$ which is under consideration.

In FIGURE 1 the deformable control member is shown as being a possibly metallic bellows $20e$ which is supported by a bracket $16e$ and the free end of which is connected through a cable $17e$ to the free ends of a spring $9e$ and a telescopic damper $15e$, the other ends of said spring and damper being fixed to a second bracket $16e$. Cable $17e$ carries a peg $18e$ which slides in a slideway $30e$ formed in an arm $19e$ fast with valve $8e$. Bellows $20e$ communicates with a pipe $21e$ having port in the corresponding cushion $1e$. It goes without saying that the other cushions supporting the platform are respectively equipped with a system of the kind described hereinabove.

This system functions in the following manner. In its resting position bellows $20e$ is expanded by spring $9e$, thereby causing valve $8e$ to be wide open. As soon as the motor 6 driving compressor 7 is started, the ensuing pressure drop in passage $3e$ produces a relative depression within the bellows $20e$ that offsets at least in part the action of spring $9e$. Valve $8e$ accordingly assumes a position of equilibrium, as shown in the drawing.

Should the pressure drop accidentally in cushion $1e$, for instance when the latter passes over a ditch, thus temporarily increasing the leakage outflow rate from the lower periphery of the cushion, bellows $20e$ tends to shorten further and to thereby shift valve $8e$ into the closed position thereof through the agency of cable $17e$ and lever $19e$. Said valve may be caused to butt against stop $10e$, as dictated by the geometry of its control system, the strength of spring $9e$ and the area of bellows $20e$, and to be thereby effective in reserving all the available lift power for the remaining cushions, especially when crossing deep ditches that would otherwise place the vehicle in difficulty if it were equipped with only one air cushion or with a plurality of interdependently supplied cushions.

Once the cause of the leakage outflow is eliminated, the pressure in cushion $1e$ rises anew and the valve reverts to its position of equilibrium; it may shift beyond this position responsively to a pressure increase in the cushion, due, say, to an accidental decrease in the leakage outflow rate at the periphery of skirt 2e and to the bellows 20e giving way to spring 9e.

Damper 15e prevents valve oscillation, but an appropriate choice of the passageway cross-section through conduit 21e and of the internal volume of bellows 20e will permit of dispensing with damper 15e, since the bellows may act in lieu thereof.

Figure 2:
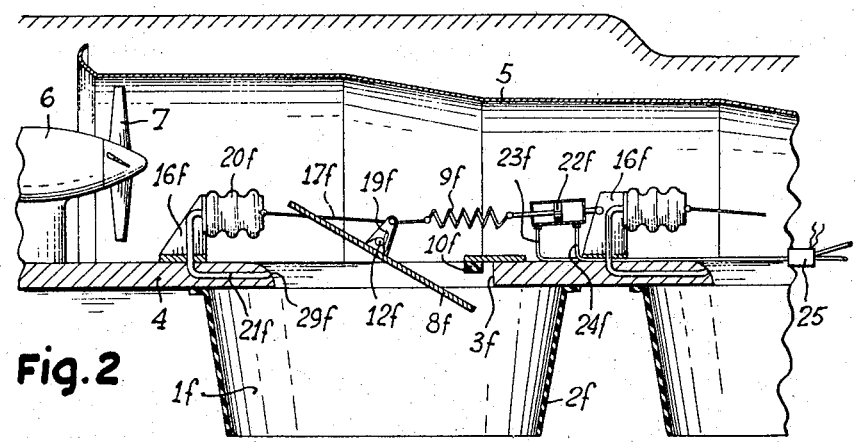
FIGURE 2 shows in corresponding fashion an alternative method of feeding the pneumatic control member that permits positional adjustment of the valve in addition.

Reference is now had to FIGURE 2 for a first alternative embodiment in which the attachment point of a spring 9f and the corresponding normal open position of valve 8f can be selectively shifted by the pilot of the platform through the agency of a small hydraulic jack 22f which is interposed between spring 9f and a bracket 16f and fed via pipes 23f, 24f, into at least one of which pipes is inserted an electrically operated valve 25. Lever 19f is formed without a slideway therein and cable 17f is attached directly to its extremity, the resulting obliquity of the cable remaining small. Lastly and above all, conduit 21f places bellows 20f in communication with a pressure takeoff 29f positioned in passage 3f, preferably at the rounded upflow edge thereof. Takeoff 29f may be a static pressure takeoff, for example.

As a result of this modified constructional form, the pressure within bellows 20f is made dependent upon the velocity of the air entering cushion 1f through passage 3f. This pressure will decrease as said velocity increases if takeoff 29f is a static pressure takeoff, as indicated precedingly. Any increase in the leakage outflow rate at the periphery of cushion 2f will further increase the force exerted by the bellows in opposition to spring 9f, though in obedience to a law different from the law governing the system shown in FIGURE 1.

Figure 3:
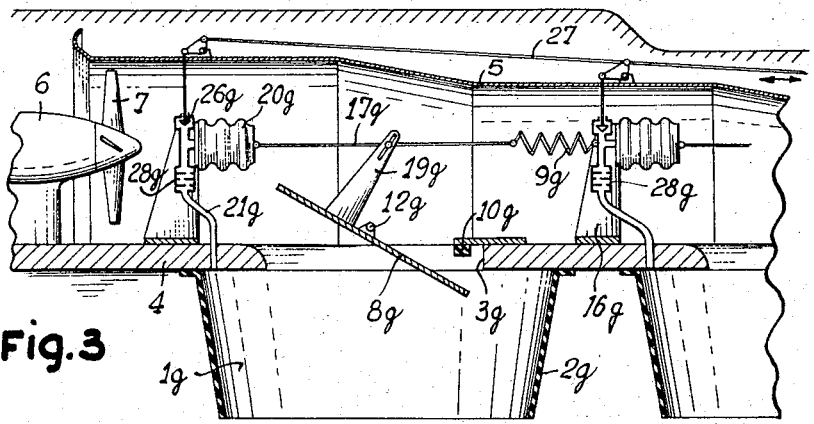
FIGURE 3 shows in corresponding fashion another alternative embodiment in which the sensitivity of the pneumatic system can be continuously adjusted.

Reference is lastly had to FIGURE 3 for a second alternative embodiment in which the interior of a bellows 20g, which is mounted on a bracket 16g and operates a valve 8g via a cable 17g and a lever 19g, is placed in communication, firstly, with the corresponding cushion 1g via a conduit 21g similar to the conduit in FIGURE 1, and secondly with distribution conduit 5 via a passage which can be closed completely by a valve 26g. This valve and those associated to the other cushions are actuated by the pilot in any convenient manner well known per se, for instance by means of a linkage system 27. Preferably, pressure dropping or pressure loss inducing means 28g such as a series of thin-walled baffles or a tube of sufficiently small cross-section and suitable length are inserted into conduit 21g.

Thus, when the pilot operates linkage system 27, the ensuing opening of valve 26g nullifies for all practical purposes the pressure differential across the inside and outside of bellows 20g, whereby valve 8g is in effect subjected only to the aerodynamic forces exerted thereon and to the force of spring 9g urging it into its open position. Conversely, total closure of valve 26g will result in a configuration and principle of operation similar to those of FIGURE 1. However, valve 8g is more sensitive to the pressure differential between cushion 1g and distribution conduit 5 in the latter-mentioned case than in the former. The pilot can select any intermediate degree of sensitivity by intermediate settings for the degree of opening of valve 26g.

It goes without saying that the present invention is by no means limited to the specific forms of embodiment hereinbefore described, and that many changes and substitutions of parts may be made without departing from the spirit and scope of the invention. By way of example, a bellows or a capsule 20 associated to a spring 9 could be caused to act upon a slide-valve controlling a hydraulic jack adapted to operate a valve. Similarly, the static pressure takeoff 29f could be replaced by means for sensing, to a certain extent at least, the dynamic pressure prevailing in passage 3f.

What is claimed is:

1. In a ground effect machine of the kind having a platform supported by a plurality of unit air cushions, a system for distributing air to said cushions and including air compressing means; a main conduit supplied with compressed air from said air compressing means; a plurality of unit conduits connected to said main conduit for collecting the compressed air therefrom and connected to the respective cushions for supplying this compressed air thereto; an air flow controlling valve in each unit conduit, each valve having a normally open position and being adapted to be moved toward an operative position wherein the associated unit conduit is at least partly closed; elastic return means for urging each valve into the open position thereof; hollow deformable members associated to each valve which are subjected externally to the pressure in said main conduit and internally to a pressure equal to or lying between the pressures prevailing respectively in said main conduit and in the cushion associated to that particular valve, said members opposing said elastic return means for urging the valve into its open position.

2. A ground effect machine as claimed in claim 1, wherein each deformable member is a bellows communicating via a static pressure takeoff with the interior of the corresponding air cushion.

3. A ground effect machine as claimed in claim 1, wherein each deformable member communicates with a pressure takeoff positioned in the inner side of the corresponding feed conduit.

4. A ground effect machine as claimed in claim 3, wherein said takeoff is a static pressure takeoff.

5. A ground effect machine as claimed in claim 1, wherein each deformable member communicates with a pressure takeoff positioned in the rounded edge of the corresponding feed conduit.

6. A ground effect machine as claimed in claim 1, including a valve means for each deformable member which communicates with the interior of the corresponding air cushion and with the main distribution conduit, said valve means being adjustable by the pilot of said machine.

7. A ground effect machine as claimed in claim 1, wherein each valve bears a lever and said elastic return means includes an opening spring for said valve, binding means connecting each said lever to said valve-opening spring and to the associated deformable member.

8. A ground effect machine as claimed in claim 7, wherein said elastic return means also includes a damper, and said valve-opening spring is associated to said damper.

9. A ground effect machine as claimed in claim 7, including means for shifting the attachment point of said valve opening spring on the machine.

10. A ground effect machine as claimed in claim 1, including pressure loss inducing means and wherein each deformable member is adapted to damp the motion of the corresponding valve by means of said pressure loss inducing means.

References Cited
UNITED STATES PATENTS 3,233,692   2/1966   Guienne _____ 180—7

A. HARRY LEVY, *Primary Examiner*.